United States Patent [19]
Hee

[11] Patent Number: 5,135,291
[45] Date of Patent: Aug. 4, 1992

[54] AUTOMOBILE BRAKE SAFETY SYSTEM WITH SPEED SENSING AND BRAKE PRESSURE MODULATION

[76] Inventor: Nam Y. Hee, 88-284, Dae Jo Dong, Eun Pyung Gu, Seoul, Rep. of Korea

[21] Appl. No.: 575,288

[22] Filed: Aug. 30, 1990

[30] Foreign Application Priority Data

Sep. 1, 1989 [KR] Rep. of Korea .................. 89-12657

[51] Int. Cl.$^5$ .................. B60T 8/36; B60T 8/64
[52] U.S. Cl. .................. 303/113 SS; 303/119 SV; 303/DIG. 4; 303/115 EC
[58] Field of Search .................. 364/426.02; 303/3, 10, 303/11, 15, 20, 113 SS, 115 EL, 119 SV, DIG. 3, DIG. 4

[56] References Cited

U.S. PATENT DOCUMENTS

| | | | |
|---|---|---|---|
| 3,608,978 | 9/1971 | Neisch | 303/113 AP |
| 3,904,251 | 9/1975 | Hikida et al. | 303/109 |
| 4,708,406 | 11/1987 | Takagi et al. | 303/100 X |
| 4,925,252 | 5/1990 | Hee | 303/89 |

FOREIGN PATENT DOCUMENTS 26659 2/1983 Japan .................. 303/DIG. 4

*Primary Examiner*—Robert J. Oberleitner
*Assistant Examiner*—Alfred Muratori
*Attorney, Agent, or Firm*—Salter, Michaelson & Benson

[57] ABSTRACT

An automobile brake safety system wherein braking is automatically maintained once a brake pedal of an automobile is depressed. The brake safety system comprises a solenoid compresor valve (SCV) assembly provided between the master cylinder and wheel cylinder of an automobile, and an electronic control circuit for controlling the SCV. The brake system is operative for increasing the pressure in a wheel cylinder in the event that pressure in the wheel cylinder decreases after braking has been maintained for a prolonged period of time, or in the event that the master cylinder malfunctions. The brake system is further operative for reducing the pressure in the wheel cylinder of a vehicle when the vehicle is accelerated by an operator thereof. The SCV is mounted in the oil path between the master cylinder and the wheel cylinder and it comprises a brake solenoid coil, a compressor solenoid coil, and a release solenoid coil. The SCV is operated in response to the electronic control circuit which is responsive to electrical signals from a brake pedal switch, a one-way switch, a pressure switch, and a hand brake switch for controlling the electrical power supply to the solenoid coils of the SCV.

3 Claims, 6 Drawing Sheets

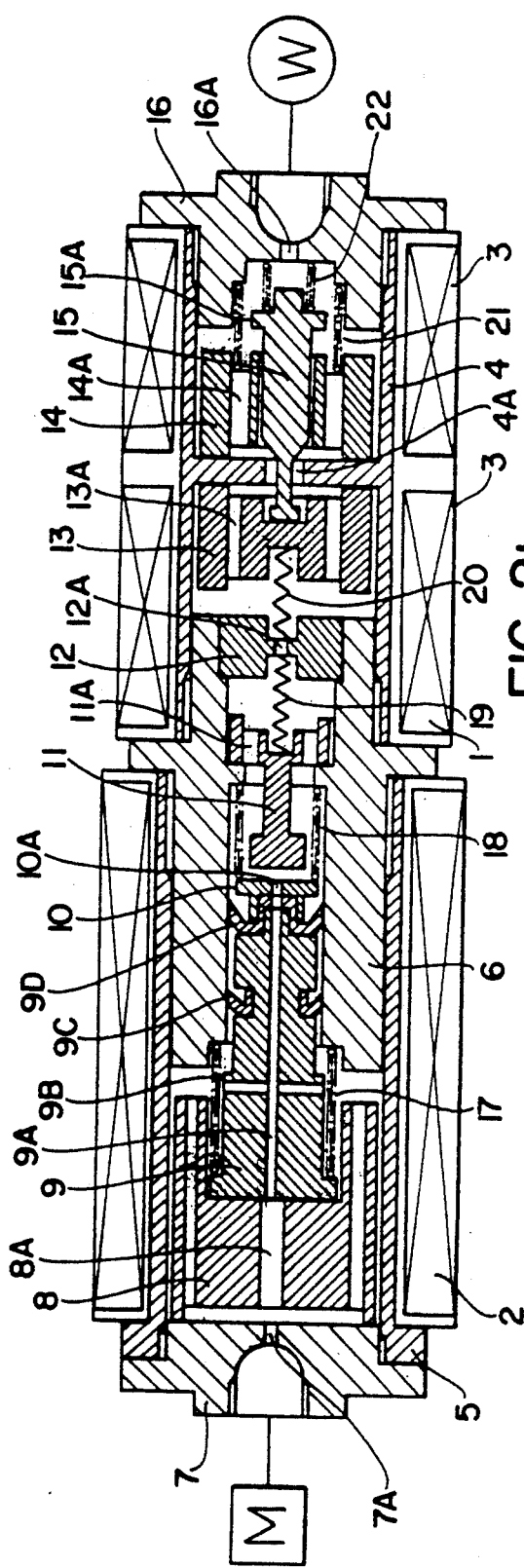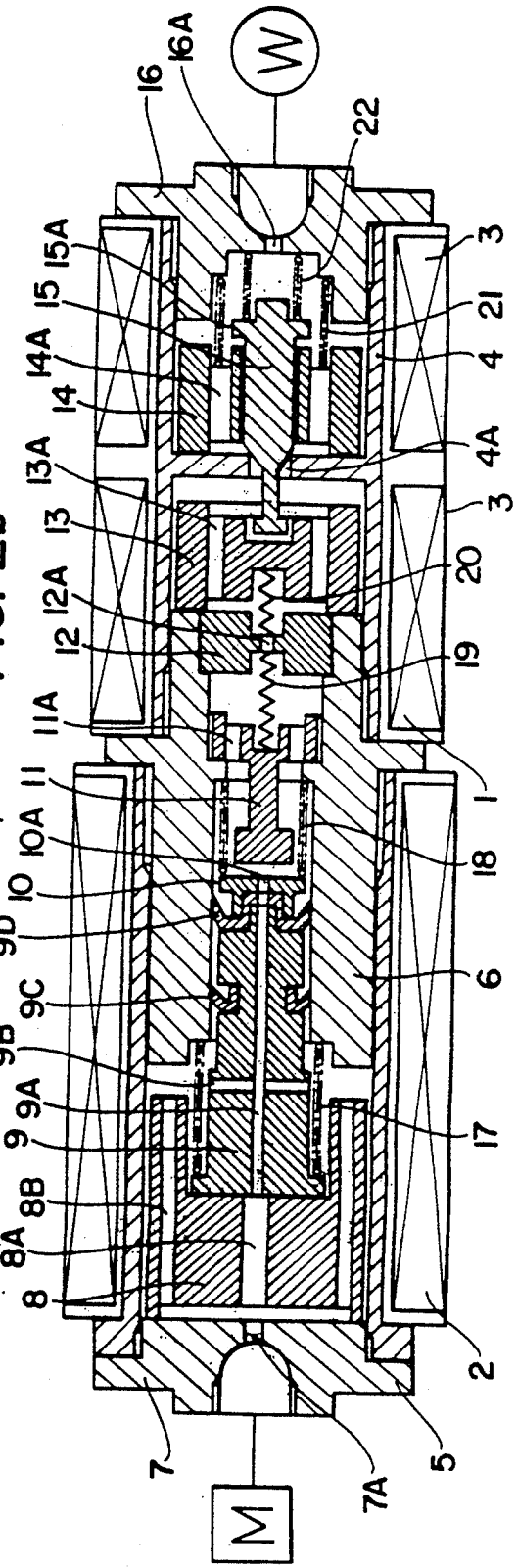

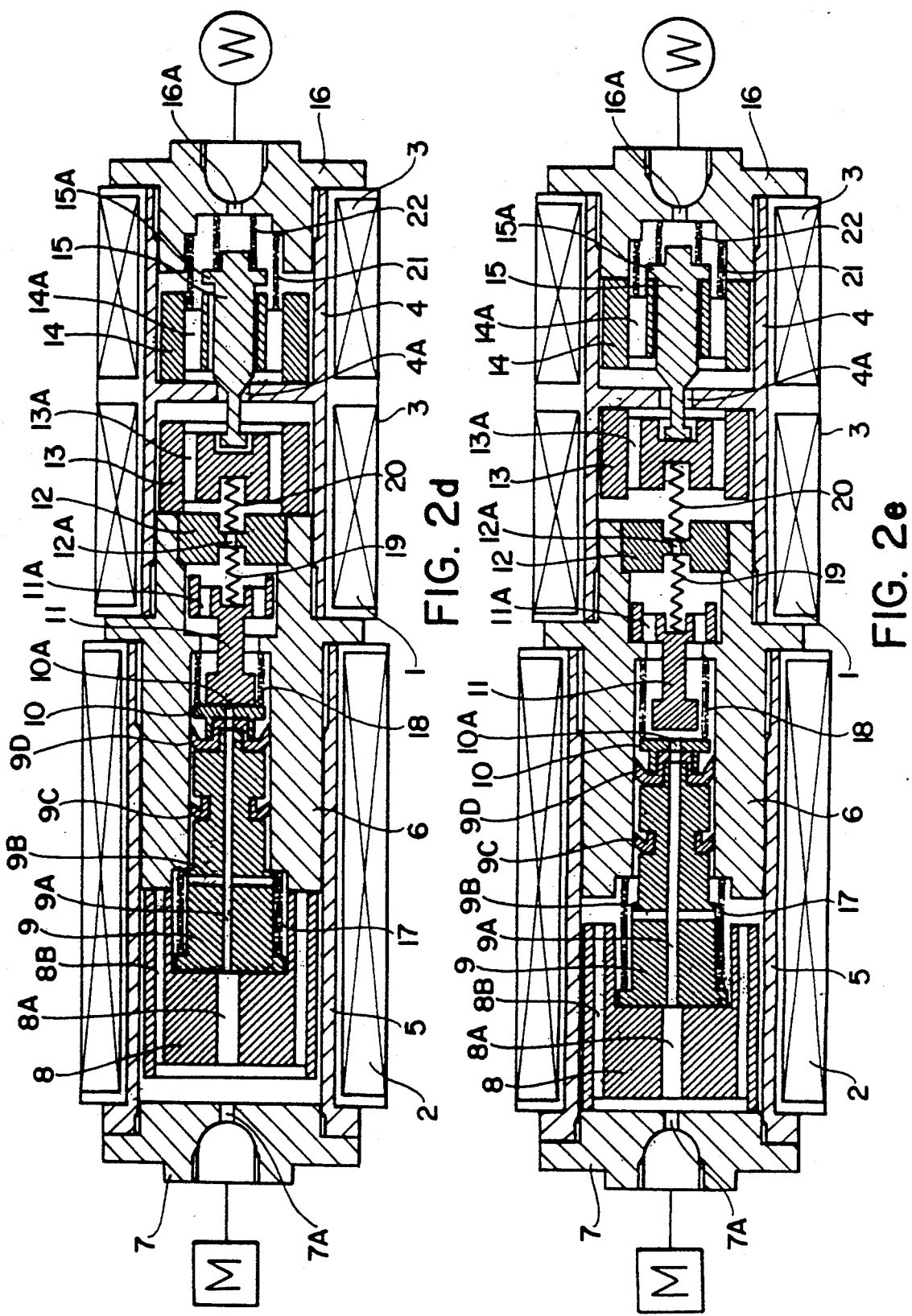

AUTOMOBILE BRAKE SAFETY SYSTEM WITH SPEED SENSING AND BRAKE PRESSURE MODULATION

BACKGROUND OF THE INVENTION

The instant invention relates to an automobile brake safety system wherein braking is automatically maintained once a brake pedal of an automobile is depressed.

Heretofore, it has been necessary to either manually maintain the brake pedal of an automobile in a depressed condition, or to operate a hand brake of the automobile, in order to maintain the automobile in a stopped condition. Further, it has been found that when the hand brake of an automobile is not properly set while parking, inadvertent rolling of the automobile can cause an accident. Further, when the master cylinder of the brake system of an automobile fails during vehicle operation the result can be a severe accident. Still further, when the hand brake of a automobile is operated frequently the wire cable thereof can become sufficiently loose so as to diminish the effectiveness of the hand brake in emergency situations. It has been found that accidents have frequently been caused by poorly operating hand brakes, or by driver carelessness in setting hand brakes.

In addition, it has been found that frequently, after stopping an automobile on a level road, a driver will release his or her foot from the brake pedal, and that when braking on a sloped road a driver will frequently maintain his or her brake pedal in a depressed condition without utilizing the hand brake. In such cases, when an automobile is struck by another automobile from in front or behind, the foot of the operator of the first automobile is removed from the brake pedal by the force of the collision causing the first automobile to be instantly rolled by the force of the collision. It has been found that this can result in serious neck injuries to those riding in the first automobile and that it can also cause serial collisions with other vehicles.

SUMMARY OF THE INVENTION

The instant invention provides a brake system which is operative for solving the above problems by maintaining braking pressure on a wheel cylinder of an automobile after the automobile has been stopped and pressure on the brake pedal of the automobile has been released. Specifically, the instant invention provides a brake system comprising a solenoid compressor valve (SCV) between the master cylinder and the wheel cylinder of a vehicle for maintaining pressure in the wheel cylinder after the pressure applied to the master cylinder by a brake pedal has been released. Further, the SCV of the brake system of the instant invention is operative for increasing the pressure in a wheel cylinder of an automobile in the event that the pressure in the wheel cylinder begins to fall after braking is maintained for a prolonged period of time, or in the event that the master cylinder associated with the wheel cylinder malfunctions. The SCV is further operative for reducing the pressure in a wheel cylinder when the vehicle thereof is accelerated by an operator in a forward or a reverse direction so that the vehicle can be driven in a normal manner.

In a conventional brake system, hydraulic fluid is transmitted from a master cylinder to a wheel cylinder by applying force to a brake pedal, and a piston in the wheel cylinder causes a pad, or lining, to be pressed against a disc or drum in order to brake the vehicle. However, in accordance with the brake system of the instant invention, the SCV is mounted in the oil path between the master cylinder and the wheel cylinder, and a brake solenoid coil, a compressor solenoid coil, and a release solenoid coil are mounted on the external circumferential surface of the SCV. The SCV is operated in response to a controller which is responsive to electrical signals from a brake pedal switch, a one-way switch, a pressure switch, and a hand brake switch, for controlling the electrical power supply to the solenoid coils of the SCV.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIGS. 2(A) to 2(E) are diagrams showing a solenoid compressor and valve (SCV) in accordance with the present invention in which;

FIG. 2(A) is an exploded perspective view of the SCV;

FIG. 2(B) is a longitudinal cross sectional view showing the SCV in a neutral steady state;

FIG. 2(C) is a longitudinal cross-sectional view showing the SCV in an activated state for blocking the oil path;

FIG. 2(D) is a longitudinal cross-sectional view showing the SCV in an activated state adding oil pressure to the wheel cylinder; and FIG. 2(E) is a longitudinal cross-sectional view showing the SCV in a release state, releasing oil pressure from the wheel cylinder;

FIGS. 3(A) to 3(E) are diagrams showing a one-way switch in accordance with the present invention in which:

FIG. 3(A) is an exploded perspective view of the one-way switch;

FIGS. 3(B) to FIG. 3(D) are longitudinal, cross-sectional views taken along the front of the one-way switch for illustrating the operation states of the one-way switch; and FIG. 3(E) is a cross-sectional view taken along the line A—A' of FIG. 3(B).

PREFERRED EMBODIMENT OF THE INVENTION

Hereinafter, the configuration of the brake safety system, in accordance with the present invention, will be described in detail with reference to the accompanying drawings.

Figure 1:
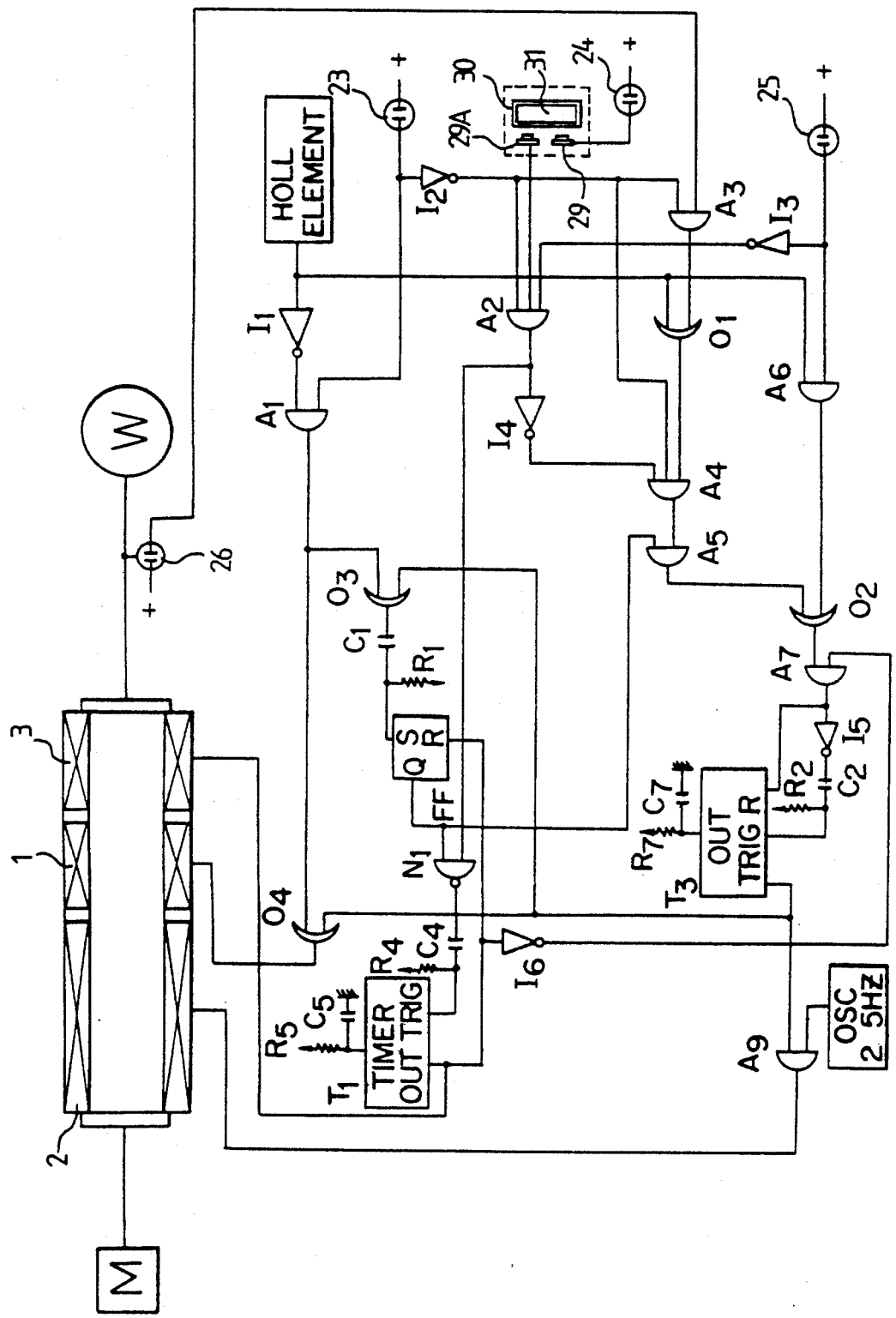
FIG. 1 is a schematic illustration showing the overall configuration of a brake safety system in accordance with the present invention.

Referring now to FIG. 1, there is shown a circuit diagram of a controller in the overall configuration of the brake safety system in accordance with the present invention.

A solenoid compressor valve (SCV) is provided between a master cylinder M and a wheel cylinder W of an automobile and the circuit illustrated in FIG. 1 is operative for receiving and processing signals from a Hall element which detects the rotation of a car wheel, a brake switch 23 provided at the brake pedal, and a one-way switch having a terminal 29 which is connected to an accelerator switch 24 attached to an accelerator pedal and a terminal 29A which is connected to an output. The circuit is further operative for receiving and processing signals from a pressure switch 26 provided between the wheel cylinder W and the SCV and a hand brake switch 25, as shown. The SCV is configured such that brake solenoid coil 1 is mounted to the SCV. A timer T1 is provided which is adjusted by a time constant of a capacitor C4 and a resistor R4 by converting the output from a flip-flop circuit FF before inputting the resulting signal to a release solenoid coil 3. A second timer T3 is provided which is adjusted by a time constant of a capacitor C2 and a resistor R2 so that its output can be sent to an input line of compressor solenoid coil 3 during an outputting period of time determined by an oscillator (OSC).

FIGS. 2(A) to 2(E) show the SCV of the present invention as provided between master cylinder M and wheel cylinder W. The SCV is constructed such that brake solenoid coil 1, and release solenoid coil 3, are respectively mounted on an external circumferential surface of cylinder 4, and connecting core 6 is inserted into cylinder 4. Pushing core 13 is received in the interior of cylinder 4 on one side of opening and closing hole seat 4A. Opening and closing bar 15 is received in the center of accelerating core 14 such that opening and closing bar 15 may be contacted to, or released from opening and closing hole seat 4A. Opening and closing bar 15 is made such that the end thereof contacts pushing core 13 while flange 15A abuts accelerating core 14. Rear cap 16 is received and secured at the end of cylinder 4. Spring 21 resiliently biases accelerating core 14 and spring 22 resiliently biases opening and closing bar 15. Blocking hole seat 10 is mounted on compressing bar 9 which is received in packings 9C and 9D within the central portion of connecting core 6. A blocking bar 11 is provided, and a fixing piece 12 is fixed to the end of connecting core 6. Blocking bar 11 is made such that spring 20 biases pushing core 13. Spring 19 biases blocking bar 11, spring 18 biases blocking hole seat 10, and spring 17 biases compressing bar 9. Compressor solenoid coil 2 is mounted on the external circumferential surface of cylinder 5, and connecting core 6 is received and secured in cylinder 5. Compressing core 8 is received in the interior of cylinder 5, and front cap 7 is secured to the terminal end of cylinder 5. Front cap 7 is coupled to master cylinder M, and rear cap 16 is coupled to wheel cylinder W, such that oil is passed through oil paths 7A, 8A, 9A, 10A, 11A, 12A, 13A, 14A, and 16A.

Referring now to FIGS. 3(A) through 3(E), there is shown a one-way switch for releasing the braking system in accordance with the present invention. The one-way switch comprises two fixed contact terminals 29 and 29A fixed at one sidewall within a small chamber of the main body 28. Permanent magnet 31 is received in movable contact terminal 30 which is movable in said small chamber of main body 28 between fixed contact terminals 29 and 29A, and partitioning wall 28A. The one-way switch further comprises steel plate 33 which is received and secured in recess 34A of mobile body 34, and second permanent magnet 32 which is received and secured in a second recess 34B of mobile body 34. A pulling rod 36 is inserted through elongate hole 34C in a side of mobile body 34, and stepped head 35A of pulling rod 36 is constructed so as to be engageable by partitioning wall 34D at an intermediate position within mobile body 34. In assembling mobile body 34 to main body 28, pulling rod 36 is inserted into hole 28B in the sidewall of main body 28. Each of the permanent magnets 31 and 32 are positioned such that their north and south poles confront one another and are hence able to attract one another. Compression coil spring 35 is resiliently mounted around pulling rod 36 so as to bias mobile body 34. The switch further comprises cover 37 having projections 37A which are respectively coupled and fixed to protrusions 28C projecting from the sidewalls of main body 28.

The operation and effect of the present invention as contemplated in the preferred embodiment will hereinafter be described in detail with reference to the overall electrical power supplying order of the SCV, the one-way switch, and the controller circuit.

Figure 2A:
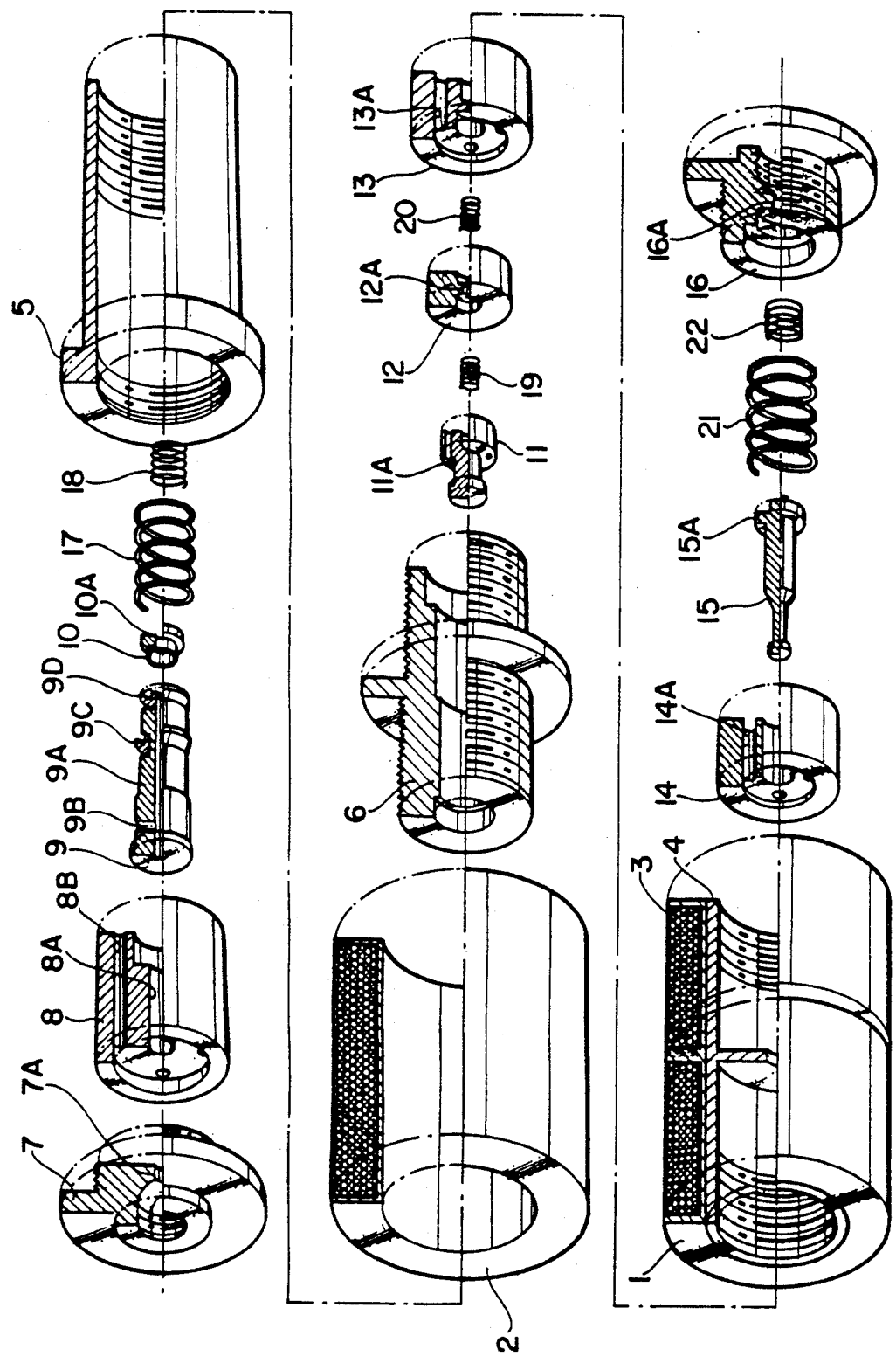

Referring again to FIGS. 2(A) to 2(E), there are shown the various operating states of the SCV, wherein the oil path is blocked when opening and closing bar 15 is contacted closely within opening and closing hole seat 4A, and the oil path is opened when opening and closing bar 15 is released away from opening and closing hole seat 4A. Referring now specifically to FIG. 2(B), the SCV is shown in a neutral, steady state. The resiliency of spring 20 which urges pushing core 13 is stronger than the resiliency of spring 22 which urges opening and closing bar 15, and therefore opening and closing bar 15 is pushed by pushing core 13 resulting in opening and closing bar 15 being pushed away from opening and closing hole seat 4A, leaving the oil path open. In this state the oil is able to freely pass between master cylinder M and wheel cylinder W of the automobile through oil paths 7A, 8A, 9A, and 10A, 11A, 12A, 13A, 14A, and 16A. The SCV is always maintained in this state while the automobile is moving.

When the brake pedal is depressed to stop the car, brake switch 23 is in the "on" position, and an electric power supply is fed to brake solenoid coil 1. When the electric power supply is supplied to brake solenoid coil 1, as shown in FIG. 2(C), an electromagnetic force is generated, and pushing core 13 is attracted to connecting core 6, while simultaneously, opening and closing bar 15 is contacted closely with opening and closing hole seat 4A as a result of the resiliency of spring 22, and hence the oil path is blocked. When pressure from master cylinder M is applied to the oil path, the oil flows into wheel cylinder W by pushing opening and closing bar 15. However, once the oil flows into wheel cylinder W, opening and closing bar 15 cannot be pushed back into an open position and the oil cannot flow out of wheel cylinder W toward master cylinder M. When the brake pedal is released and the oil pressure from master cylinder M is released, the higher pressure oil within wheel cylinder W pushes against opening and closing bar 15 and causes it to be contacted further strongly with opening and closing hole seat 4A, whereby an electrical power supply to brake solenoid coil 1 is not required, and braking is maintained by itself. When the brake pedal is released, and electric power supply to brake solenoid coil 1 is cut off, pushing core 13 opens the oil path by pushing opening and closing bar 15 due to the resiliency of spring 20. However, the oil path is not opened because the pressure of the oil within wheel cylinder W is greater than the force of spring 20 and braking is thereby maintained.

Although braking is maintained within wheel cylinder W by the pressure of the oil trapped therein, oil pressure in the wheel cylinder W may decrease over a prolonged period of time when the automobile is parked. When the oil pressure within wheel cylinder W decreases and the automobile begins to roll, the electric power supply connected to pressure switch 26 is fed through the electronic circuit to brake solenoid coil 1, and to compressor solenoid coil 2. When the electrical power supply is applied to brake solenoid coil 1, and to compressor solenoid coil 2, as shown in FIG. 2(C), pushing core 13 and compressing core 18 are respectively attracted to each end of connecting core 6. When compressing core 8 pushes compressing bar 9 due to the attracting force toward connecting core 6, oil path 10A through blocking hole seat 10 is blocked by blocking bar 11 and a pressure is produced, wherein the oil pushes opening and closing bar 15 to allow oil to flow into wheel cylinder W.

When the electric power supply to compressor solenoid coil 2 is cut off, compressing bar 9 is released by the resiliency of springs 17 and 18, and compressing bar 9 rests in a position away from blocking bar 11. When electric power is not supplied to brake solenoid coil 1, but is supplied only to compressor solenoid coil 2, pushing core 13 pushes opening and closing bar 15, and the oil path 10A of blocking hole seat 10 is blocked by blocking bar 11 so that pushing core 13 pushes opening and closing bar 15, and the oil path is opened. When electric power to compressor solenoid coil 2 is cut off, compressing bar 9 is released and the oil within wheel cylinder W flows therefrom to master cylinder M. Therefore, in situations where electric power is supplied to compressor solenoid coil 2, electric power should always be supplied also to brake solenoid coil 1.

Electric power to compressor solenoid coil 2 is supplied and cut off from the electronic circuit between two to five times per second, whereby compressing bar 9 is repeatedly operated and oil pressure within wheel cylinder W is increased quickly and braking is safely maintained.

In a situation where master cylinder M fails during operation and an emergency hand brake is applied, hand brake switch 25 activates the electric power supply within the system, and electric power is supplied through the electronic circuit to brake solenoid coil 1 and to compressor solenoid coil 2 thereby causing oil to flow into wheel cylinder W to maintain braking pressure and reduce braking distance.

When it is desired to accelerate the car from a stopped position, the braking system is released, whereupon the electric power supply connected through the one-way switch is fed through the electronic circuit to release solenoid coil 3, and braking is released by a clutch operation. When the electric power supply is applied to release solenoid coil 3, as shown in FIG. 2(E) accelerating bar 14 abuts flange 15A of opening and closing bar 15, and is attracted to rear cap 16. Accordingly, opening and closing bar 15 is actuated away from opening and closing hole seat 4A whereby the oil path is opened and oil within wheel cylinder W flows towards master cylinder M thereby releasing the braking system so that the car may be accelerated. After release of the braking system, the electric power supply to release solenoid coil 3 is cut off and opening and closing bar 15 is pushed by pushing core 13, thereby opening the oil path. The open oil path state, as described, can be seen in FIG. 2(B).

Referring now to FIGS. 3(A) to 3(E), there are shown the operating positions of the one-way switch for connecting the electric power supply to release the braking system. Pulling rod 36 is connected to an operating wire of a clutch pedal. When the clutch pedal is depressed, stepped head 36(A) of pulling rod 36 engages partitioning wall 34(D). When the clutch pedal is released, mobile body 34 is returned to its original state by the resiliency of spring 35. When the clutch pedal is not depressed, permanent magnet 31 and permanent magnet 32 are in close proximity to one another, and fixed contact terminals 29 and 29(A), and movable contact terminal 30 are not contacted to each other, (seen in FIGS. 3(B) and 3(C)). When the clutch pedal is depressed and mobile body 34 is actuated, permanent magnet 31 is pulled toward permanent magnet 32 (refer to FIG. 3(B)), however, permanent magnet 31 is obstructed by partitioning wall 28(A) and the distance between permanent magnet 31 and permanent magnet 32 becomes greater, thereby reducing the force of attraction between the magnets. Because permanent magnet 31 is attracted toward steel plate 33, which moves successively, permanent magnet 31 is maintained in its obstructed position in fixed contact terminals 29 and 29(A), and movable contact terminal 30 remains in an uncontacted state.

Figure 3A:
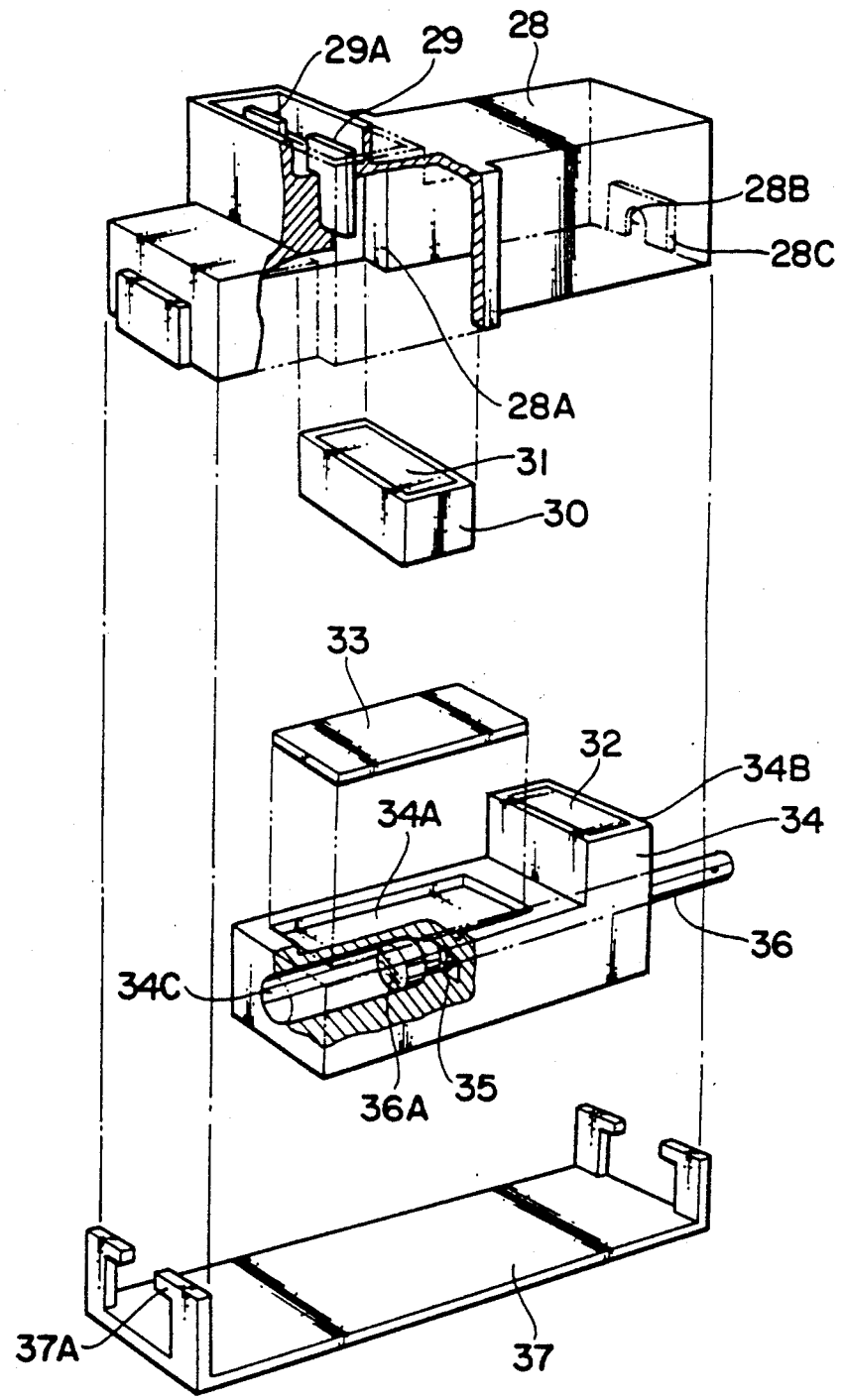
Figure 3B:
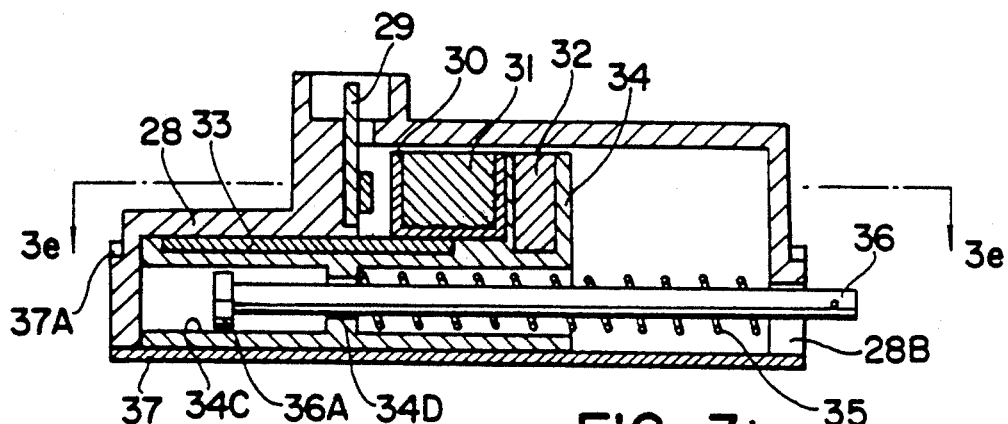
Figure 3C:
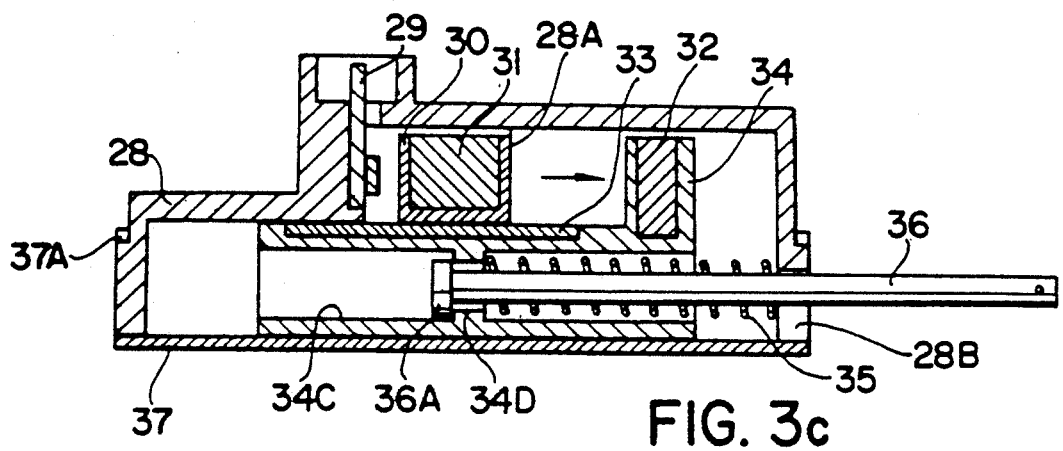
Figure 3D:
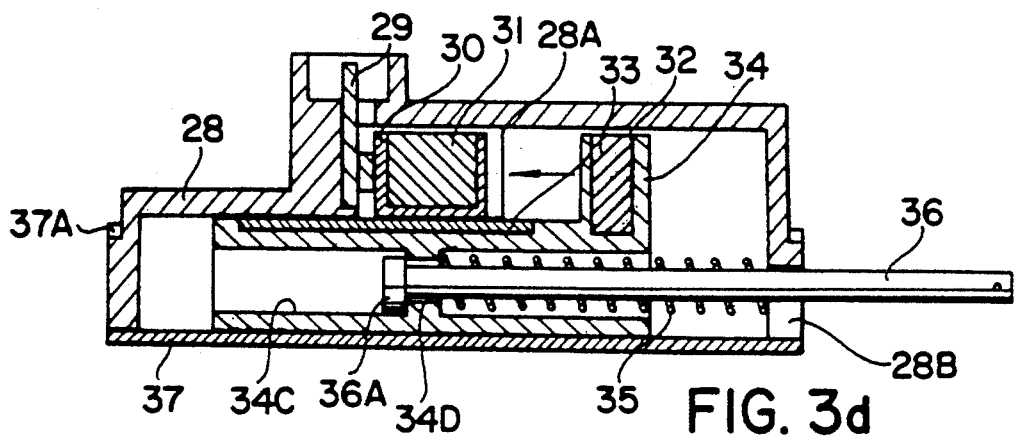
Figure 3E:
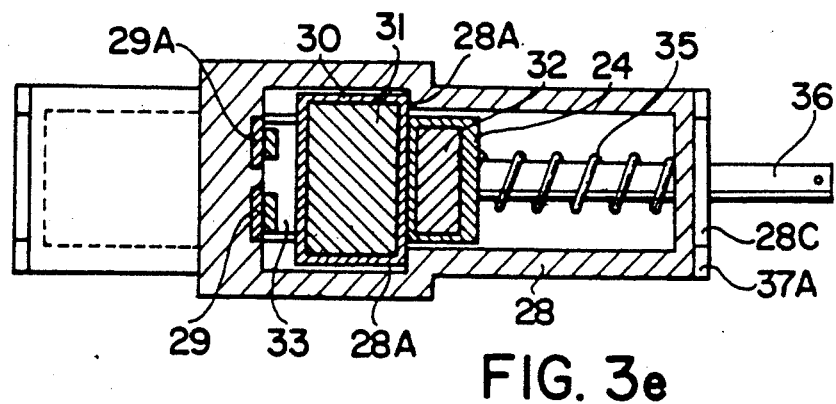

When the clutch pedal is depressed, the ignition key is turned, and then the clutch pedal is released, mobile body 34 is released. Because permanent magnet 31 is attracted toward steel plate 33, as shown in FIG. 3(C), permanent magnet 31 is also actuated in a direction such that steel plate 33 is moved, and movable contact terminal 30 attached to permanent magnet 31 is contacted to fixed contact terminals 29 and 29(A), and the electric supply therefor is connected. When mobile body 34 is completely released and permanent magnet 31 and permanent magnet 32 are attracted toward one another, fixed contact terminals 29 and 29(A), and movable contact terminal 30, are released away from one another and electric power supply is cut off.

When the clutch is operated for a long period of time, clearance of the clutch can change and the difference of the stroke in depressing the clutch can vary according to the particular operator However, pulling rod 36 adjusts to these variations by maintaining clearance space 0' and 0 at the time the clutch pedal is depressed and released, and regardless of the variation of the clutch clearance, electric power supply is always maintained and the braking can always be correctly and safely released.

Referring now to FIG. 1, there is shown a schematic diagram of the electrical circuit for operating the braking system. In the braking system of the present invention a solenoid compressor valve (SCV) is provided between master cylinder M and wheel cylinder W of an automobile, and brake solenoid coil 1, compressor solenoid coil 2 and release solenoid coil 3 are mounted to the SCV. The SCV is operated according to the electronic circuit as shown in FIG. 1. Further, pressure switch 26 is provided between the SCV and wheel cylinder W, whereby braking can be maintained when the automobile is parked for a long period of time.

When the brake pedal is depressed, brake switch 23 toggles to a high level H, and the stop signal (low level L) of a Hall device is inverted at invertor I1. The output of AND Gate A1 toggles to high level H, and because one terminal input of OR Gate 04 has a high level H, the output of OR Gate 04 goes to a high level H and the electric power supply coming from brake switch 23 is applied to brake solenoid coil 1 whereby the SCV is operated and braking is maintained. When the brake pedal is released, brake switch 23 toggles to a low level L, the output of AND Gate Al toggles to a low level L, and therefore even if the operation of brake solenoid coil 1 is interrupted, braking is maintained.

Operation of brake solenoid coil 1 is maintained by OR Gate 04 regardless of an "on" or an "off" position of the one-way switch. However, after braking is released and brake solenoid coil 1 ceases operation, the one-way switch toggles to a high level H and all inputs of AND Gate A2 are also toggled to a high level H. All of the inputs of NAND Gate N1 are now in a high level H and the output from the NAND Gate N1 is inverted to a low level L. The output from NAND Gate N1 passes through capacitor C4 and the low level L signal is applied to timer T1, and therefore release solenoid coil 3 is activated and braking is released.

When pressure switch 26 toggles to a high level H due to a reduction in the oil pressure of wheel cylinder W from parking the car for a prolonged period of time, or due to a high level H signal from the Hall device as a result of unexpected rotation of the car wheel, or both, the high level H signals pass through OR Gate 02 and toggle AND Gate A7 to a high level H, the output signal of AND Gate A7 simultaneously passes through inverter IS and toggles terminal R of timer T3 to a high position H. The output signal of inverter 15 passes through capacitor C2 triggering timer T3. The output signal of timer T3 is now in a high level H and since one input of AND Gate A9 is connected to an oscillator OSC which generates a 2-5 Hz signal, compressor solenoid coil 2 is operated at 2-5 Hz. Since the output of timer T3 is also connected to OR Gate 04, brake solenoid coil 1 is also simultaneously operated.

When the accelerator pedal is depressed and the clutch pedal is released in order to accelerate the automobile, electric power supply connected to the accelerator switch 24 passes through the one-way switch which is in an "on" position, and through AND Gate A2 and invertor 14 and the output of AND Gate A4 toggles to a low level L. The output signal of AND Gate A4 is now in a low level L and passes through AND Gate A5, OR Gate 02, AND Gate A7, and Timer T3 is reset. Further since the input of OR Gate 04 is in a low level, brake solenoid coil 1 ceases to operate, and since the input of AND Gate A9 is also in a low level L, compressor solenoid coil 2 also ceases to operate.

At this point the inputs of NAND Gate N1 are at a high level H and the output signal of NAND Gate N1 passes through capacitor C4, triggering timer T1 and activating release solenoid coil 3. However, since flip-flop FF is reset after activating solenoid coil 3, solenoid coil 3 is only activated one time.

When brake solenoid coil 1 and compressor solenoid coil 2 are activated and thereafter the accelerator pedal is depressed and the clutch pedal is released, the one-way switch is turned to an "on" position. Since flip-flop FF is set when brake solenoid coil 1 is operating, all of the inputs of NAND Gate NI toggle to a high level H when the one-way switch is in a high level H, and further since timer T1 is activated through capacitor C4, release solenoid coil 3 is activated releasing oil pressure from the braking system and the car may be accelerated.

Should the master cylinder M fail during operation so that the hand brake is operated for emergency braking, hand brake switch 25 toggles to a high level H and while the wheel of the car is rotating, the signal from the Hall device is also toggled to a high level H. The signal from hand brake switch 25 passes through AND Gate A6 and OR Gate 02, and the output from OR Gate 02 together with the reset signal of flip-flop circuit FF are inputted to terminal R of timer T3, triggering timer T3. Output signal of timer T3 activates brake solenoid coil 1 and compressor solenoid coil 2, and oil is injected into wheel cylinder W producing oil pressure therein and activating braking. Since the input of AND Gate A2 toggles to a low level L through timer T3, the output signal is not transmitted and release solenoid coil 3 cannot be operated. Therefore, even if the one-way switch toggles to a high level H, the function of the braking system as an emergency brake can still be utilized.

It is further contemplated in the preferred embodiment that the braking system of the present invention could also be attached to an automatic transmission automobile. Because an automatic transmission automobile has no clutch, accelerator switch 24 is connected directly to the electronic circuit instead of fixed contact terminal 29A of the one-way switch. The electric power supply is connected to the electronic circuit by depressing the accelerator pedal, and therefore braking would be released as described hereinbefore and the automobile can be accelerated.

Thus, according to the present invention, when the brake pedal is depressed and the automobile is brought to a stopped position, braking can be maintained even though pressure from the brake pedal is released, and therefore the inconvenience of keeping continuous pressure on the brake pedal while the car is in a stopped position is eliminated. Since an automobile utilizing the braking system of the present invention can be operated easily regardless of road conditions, fatigue and uneasiness of the driver can be mitigated. Further, in a situation where a second car collides with a first car utilizing the braking system of the instant invention while the first car is in a stopped condition, braking of the first car is maintained continuously and instantaneous movement of the first car during collision is decreased. Still further, since the braking system of the present invention prevents continuous rolling of the first car after collision, the possibility of a serial collision is reduced. Even further, since the emergency hand brakes of most automobiles are almost never utilized, the instant braking invention can serve a sufficient role as an emergency brake, and in case of failure of the master cylinder the braking system of the instant invention can execute emergency braking.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. A brake safety system for an automobile comprising:
    a solenoid compressor valve assembly connectable between a master cylinder and a wheel cylinder of said automobile, said solenoid compressor valve assembly including a brake solenoid coil, a compressor solenoid coil and a release solenoid coil;
    a Hall element having an output and operative for detecting rotation of a wheel of said automobile;

a brake switch having an output and connectable to a brake pedal of said automobile;

an accelerator switch having an output and connectable to an accelerator pedal of said automobile;

an accelerator switch having an output and connectable to an accelerator pedal of said automobile;

a one-way switch having a fixed contact terminal and an output terminal, said fixed contact terminal being connected to said accelerator switch;

a pressure switch having an output, said pressure switch being connectable to said wheel cylinder and connected to said solenoid compressor valve assembly;

a hand brake switch having an output and connectable to a hand brake of said automobile; and control circuit means connected to the outputs of said Hall element, said brake switch, said accelerator switch, and said pressure switch, and to said output terminal for controlling an operation of said brake safety system, said control circuit means including flip-flop means having an output signal, a first timer having an input signal adjusted by a time constant of a first capacitor and resistor combination, said first timer further having an output signal and a second timer having an input signal adjusted by a time constant of a second capacitor and resistor combination, said second timer further having an output signal, said brake solenoid coil being activated during periods of braking;

said output signal from said flip-flop means being inverted and applied to said first timer, said output signal of said first timer being applied to said release solenoid coil during periods of automobile accelerations, and said output of said second timer being applied to said compressor solenoid coil during an outputting period of time of an oscillator.

2. In the automobile brake safety system of claim 1, said solenoid compressor valve assembly defining an oil path between said master cylinder and said wheel cylinder and comprising:

a first cylinder having a front end, a connecting end and an external circumferential surface, said first cylinder having said compressor solenoid coil mounted on said external circumferential surface thereof;

a compressing core received in said front end of said first cylinder;

a compressing bar having a core end and a seat end, said core end being received in said compressing core for biasing said compressing core;

a blocking hole seal mounted on said seat end of said compressing bar;

a compressing bar spring for biasing said compressing bar;

a blocking hole seat spring for biasing said seat;

a front cap received and secured in said front end of said first cylinder;

a second cylinder having a rear end defining an opening and closing hole seat, a connecting end and an external circumferential surface, said second cylinder having said brake solenoid and said release solenoid coil mounted on said external circumferential surface thereof;

a pushing core received in said connecting end of said second cylinder;

a fixing piece on top of said pushing core;

a pushing core spring resiliently mounted between said fixing piece and said pushing core for biasing said pushing core;

a blocking bar on top of said fixing piece;

a blocking bar spring extending between said fixing piece and said blocking bar for biasing said blocking bar;

an accelerating core received in said rear end of said second cylinder;

an opening and closing bar having a pushing end and a flange end, said closing bar being received in said accelerating core, said closing bar being configured such that it may be contacted with or drawn away from said opening and closing hole seat and further being configured such that said pushing end thereof communicates with said pushing core and said flange end thereof abuts said accelerating core;

a connecting core having first and second ends, said first end thereof being received and secured in said connecting end of said first cylinder and said second end thereof being received and secured in said connecting end of said second cylinder;

a rear cap received and secured in said rear end of said second cylinder;

an accelerating core spring in said rear cap such that said accelerating core spring biases said accelerating core; and an opening and closing bar spring mounted in said rear cap such that the former biases said opening and closing bar.

3. In the brake safety system of claim 1, said one way switch further comprising:

a main body;

two fixed contact terminals secured in said main body;

a movable contact terminal attached to a first permanent magnet, said movable contact being movable in said main body between said fixed contact terminals and a partitioning wall;

a mobile body movable in said main body;

a steel plate on a recessed wall of said mobile body;

a second permanent magnet secured in said mobile body, said first and second permanent magnets being aligned within said one-way switch such that said magnets confront and attract one another;

a pulling rod received in an elongate hole in said mobile body, said pulling rod having a stepped head dimensioned so as to engage the partitioning wall in said elongate hole; and a spring mounted in said elongate hole for biasing said mobile body.

* * * * *